(12) United States Patent
Simnacher

(10) Patent No.: US 7,245,042 B1
(45) Date of Patent: Jul. 17, 2007

(54) AUXILIARY WIND ENERGY GENERATION FROM A WIND POWER GENERATION APPARATUS

(76) Inventor: Larry W. Simnacher, P.O. Box 2217, Bay City, TX (US) 77404-2217

(*) Notice: Subject to any disclaimer, the term of this patent is extended or adjusted under 35 U.S.C. 154(b) by 0 days.

(21) Appl. No.: 11/285,951

(22) Filed: Nov. 25, 2005

(51) Int. Cl.
*F03D 9/00* (2006.01)
*F03D 7/02* (2006.01)
*H02P 9/04* (2006.01)
*F03B 15/06* (2006.01)

(52) U.S. Cl. ............................ 290/55; 290/43; 290/44; 290/54; 310/12; 310/15

(58) Field of Classification Search ............ 290/43–44, 290/54–55; 310/12, 15, 36
See application file for complete search history.

(56) References Cited

U.S. PATENT DOCUMENTS

| | | | | |
|---|---|---|---|---|
| 1,352,960 A | | 9/1920 | Heyroth ..................... 290/44 |
| 2,974,265 A | * | 3/1961 | Thoma ....................... 318/132 |
| 3,968,387 A | * | 7/1976 | Scarff .......................... 310/16 |
| 3,992,132 A | * | 11/1976 | Putt ............................ 417/271 |
| 4,110,630 A | * | 8/1978 | Hendel ....................... 290/53 |
| 4,581,506 A | * | 4/1986 | Bai et al. ............... 200/61.45 R |
| 5,707,215 A | * | 1/1998 | Olney et al. ................ 417/233 |
| 5,934,882 A | * | 8/1999 | Olney et al. ................ 417/233 |
| 6,259,233 B1 | | 7/2001 | Caamano ..................... 322/89 |
| 6,411,016 B1 | * | 6/2002 | Umeda et al. ............... 310/339 |
| 6,798,090 B2 | * | 9/2004 | Cheung et al. ............... 310/17 |
| 6,809,427 B2 | * | 10/2004 | Cheung et al. ............. 290/1 R |
| 6,812,583 B2 | * | 11/2004 | Cheung et al. ............. 290/1 R |
| 7,026,900 B1 | * | 4/2006 | Gregory et al. ............. 335/220 |
| 7,042,109 B2 | * | 5/2006 | Gabrys ........................ 290/44 |
| 7,148,583 B1 | * | 12/2006 | Shau et al. ................. 290/1 R |
| 7,157,835 B2 | * | 1/2007 | Sakai ......................... 310/339 |
| 2003/0137149 A1 | | 7/2003 | Northrup et al. ............. 290/44 |
| 2003/0155771 A1 | * | 8/2003 | Cheung et al. ............. 290/1 R |
| 2003/0227174 A1 | | 12/2003 | Bayly .......................... 290/55 |
| 2004/0041408 A1 | | 3/2004 | Casazza ....................... 290/55 |
| 2004/0041409 A1 | | 3/2004 | Gabrys ........................ 290/55 |
| 2004/0155467 A1 | * | 8/2004 | Cheung et al. ............. 290/1 R |
| 2004/0222756 A1 | | 11/2004 | Crookes ....................... 318/138 |
| 2006/0233653 A1 | * | 10/2006 | Trapalis ...................... 418/54 |
| 2006/0250029 A1 | * | 11/2006 | Kelly et al. .................. 310/12 |
| 2007/0024126 A1 | * | 2/2007 | Brennvall .................... 310/14 |

FOREIGN PATENT DOCUMENTS

DE 19636591 3/1998
DE 10140516 3/2003

* cited by examiner

*Primary Examiner*—Darren Schuberg
*Assistant Examiner*—Pedro J. Cuevas
(74) *Attorney, Agent, or Firm*—Egbert Law Offices

(57) ABSTRACT

A wind energy generator has a generator having a shaft extending therefrom, a plurality of blades interconnected to the shaft so as to be rotatable by the action of wind energy, and an elongate chamber cooperative with the shaft such that the chamber rotates relative to a rotation of the shaft. The elongate chamber has a coil extending therearound. A magnet is positioned within chamber such that a movement of the magnet interacts with an electrical field of the coil so as to produce electrical energy therefrom. Separate elongate chambers are associated with each of the blades of wind energy generator.

13 Claims, 3 Drawing Sheets

US 7,245,042 B1

AUXILIARY WIND ENERGY GENERATION FROM A WIND POWER GENERATION APPARATUS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to wind energy generators. More particularly, the present invention relates to devices for storing and recovering energy produced from the wind energy generator. Additionally, the present invention relates to auxiliary energy generators associated with the rotating blades of a wind energy power plant.

BACKGROUND OF THE INVENTION

Wind energy generation is becoming increasing popular as a means of producing energy. The production of energy from the motion of winds is a safe, clean and efficient power source. As the blades of the wind power generator rotate, they correspondingly rotate the shaft of a turbine so as to produce energy. This energy can then be delivered for personal or commercial use. Large wind energy farms are now being built whereby a great deal of wind energy can be obtained in relatively windy areas of the country.

Unfortunately, one major problem associated with wind energy generator is that the generator can only operate under optimum wind conditions. If too little wind is being produced, then the blades will not rotate and energy will not be produced. The use of batteries is a very ineffective technique for the storing of energy as produced from the wind energy generator. As such, under most circumstances, the wind energy generators will not rotate when wind falls below a certain desired level and energy cannot be produced during such periods of time.

In the past, a variety of patents and patent publication have issued relating to such wind energy generators. An early patent relating to the subject of wind energy generation is found in U.S. Pat. No. 1,352,960. In this patent, a plurality of electrical energy generating coils are placed in proximity to magnets affixed to the periphery of the wheel of the generator. A plurality of blades or vanes extending outwardly of the wheel so as to capture the wind passing thereby. As the wheel is rotated, the excited coils will produce energy by interaction with the magnets affixed to the periphery of the wheel.

U.S. Pat. No. 6,259,233, issued on Jul. 10, 2001, describes an electric motor/generator. The stator arrangement has a dielectric electromagnet housing and at least one energizable electromagnet assembly including an overall amorphous metal magnetic core. The device includes a control arrangement that is able to variably control the activation and deactivation of the electromagnetic using any combination of a plurality of activation and deactivation parameters in order to control the speed, efficiency, torque and power of the device.

German Patent No. 10140516 teaches a wind-power electrical energy generator that has a stator provided with electromagnetic windings cooperative with permanent magnets of a wind turbine rotor. The wind turbine rotor rotates about a vertical axis and is provided with anemometric pockets of equal sides and spacing and a stator attached to a sleeve. The stator is provided with electromagnetic windings of similar size and spacings so as to cooperate with permanent magnets of the turbine rotor.

German Patent No. 19636591 teaches a generator that has a large number of poles at an outer rotor enclosing an inner stator laminations packet wound with a stator winding and supported by cooling ribs. The generator transmits the generator load to the mast head of the energy converter. The outer rotor is provided by a thin-wall cylindrical yoke with permanent magnets on its inside and cooling ribs on its outside for intensive cooling of the permanent magnets.

U.S. Patent Publication No. 2003/0137149, issued on Jul. 24, 2003 to Northrup et al., provides a segmented arc generator. This arc generator is adapted to convert mechanical power, such as wind power, into electrical power. The rotor has a plurality of salient poles disposed about a periphery of a rotor ring. The stator ring includes a plurality of stator coils wound on a ferromagnetic structure and has permanent magnets imbedded within the structure. Relative motion between a rotor pole and a corresponding stator coil induces a voltage across that coil.

U.S. Patent Publication No. 2004/0222756, published on Nov. 11, 2004 to W. M. Crookes, describes an electric motor that has a stator and a rotor. The stator an annular armature having a plurality of poles evenly spaced about the inner circumferential surface of the armature and directed towards a central longitudinal axis defined by the rotor shaft. A pair of firing circuits are connected in common and in series with respective sets of coils wound about the stator poles. The circuits are switched into and out of contact with their respective coil sets according to the position of the rotor with respect to the stator via position sensing elements which operate switches in the accumulator circuits.

U.S. Patent Publication No. 2003/0227174, published on Dec. 11, 2003 to E. Bayly, shows a wind energy conversion device that includes a propeller in which each of the propeller blades includes a proximal non-airfoil mounting section, a medial section and a distal tip section mounted to pivot relative to the medial section about a pitch axis running lengthwise of the blade. The electrical power generating components are located upwind of the propeller and centered about the propeller axis.

U.S. Patent Publication No. 2004/0041408, published on Mar. 4, 2004 to M. Casazza, provides a wind energy generator unit with high energy yield. This generator includes an air motor capable of transforming the kinetic energy of the wind into electrical energy. The generator of the of the air motor is directly and closely connected with the rotor of the air-motor.

U.S. Patent Publication No. 2004/0041409, published on March, 2004 to C. W. Gabrys, describes a wind turbine which includes a generator coupled to the turbine rotor such that the turbine rotor drives the generator. The generator rotor has circumferential arrays of multiple alternating polarity permanent magnets attached to ferromagnetic back irons such that the permanent magnets drive magnetic flux back and forth between each rotor portion and through the stationary air core armature. The stationary air core armature has multiple phase windings of multiple individually insulated strand conductor wire that is wound with two separate portions including an active length portion and an end turn portion.

It is an object of the present invention to provide a wind energy generator that includes an auxiliary energy generating apparatus.

It is another object of the present invention to provide a wind energy generator which includes an electromagnetic mechanism for enhancing the ability to rotate the blades of the wind energy generator during low wind conditions.

It is a further object of the present invention to provide a wind energy generator which utilizes the natural inertial forces and gravity for the purposes of enhancing electrical power generation.

It is still a further object of the present invention to provide a wind energy generator that facilitates the ability to store wind energy that would normally be lost during the rotation of the blades during low wind conditions.

These and other objects and advantages of the present invention will become apparent from the reading of the attached specification and appended claims.

BRIEF SUMMARY OF THE INVENTION

The present invention is a wind energy generator apparatus that includes a generator having a shaft extending therefrom, a plurality of blades interconnected to the shaft so as to rotatable by action of wind energy, and an elongate chamber cooperative with the shaft such that the elongate chamber rotates relative to a rotation of the shaft. The plurality of blades are radially spaced from each other. The elongate chamber has a coil extending therearound. The elongate chamber has a magnet positioned therein such that a movement of the magnet interacts with an electrical field of the coil so as to produce electrical energy therefrom.

In the present invention, the magnet being slidably movable within the elongate chamber relative to the rotation of the plurality of blades. The elongate chamber extends transversely to the shaft. The elongate chamber is offset from the plurality of blades axially along the shaft of the generator. In particular, the elongate chamber includes a first elongate chamber, a second elongate chamber radially offset from the first elongate chamber, and a third elongate chamber radially offset from each of the first and second elongate chambers.

A propulsion means is included within the elongate chamber suitable for urging the magnet back and forth during the rotation of the blades. The propulsion means includes a first spring mounted at one end of the elongate chamber and a second spring mounted at an opposite end of the elongate chamber. A first spring retraction means connected to the first spring for retracting the first spring prior to contact by the magnet during the rotation of the blades. A second spring retraction means is connected to the second spring for retracting the second spring prior to contact by the magnet during the rotation of the blades. Each of the first and second spring retraction means is actuatable so as to release the spring so as to propel the magnet through the interior of elongate chamber. A firing means is connected to the first and second spring retraction means for actuating the springs when the magnet approaches one of the springs.

An energy storage device is electrically connected to the generator and to the coil so as to receive and store power from the coil. During low wind conditions, the stored electrical energy can be applied to the respective spring retraction means so as to move the weighted magnet back and forth for the continued rotation of the blades in such low wind conditions.

The present invention is also a method of generating energy from a wind energy generator that includes the steps of: (1) forming an elongate chamber having a coil extending longitudinally therethrough and a magnet slidably received therein so as to electrically interact with the electrical field of the coil; (2) rotating the elongate chamber with a rotation of the blades of the wind energy generator; (3) sliding the magnet within the elongate chamber back and forth as the elongate chamber is rotated so as to produce electrical energy from the coil; and (4) transferring electrical energy from the coil.

The method present invention also includes the step of propelling the magnet from one end of the chamber to another end of the chamber during the rotation of the chamber. The step of propelling includes retracting a spring mounted on each of the ends of the elongate chamber prior to contact by the magnet, and releasing the spring when the magnet contacts the spring so as to propel the magnet. The elongate chamber is mounting so as to be axially aligned with at least one of the blades. The elongate chamber has a portion that extends outwardly beyond an end of the blade.

DETAILED DESCRIPTION OF THE INVENTION

Figure 1:
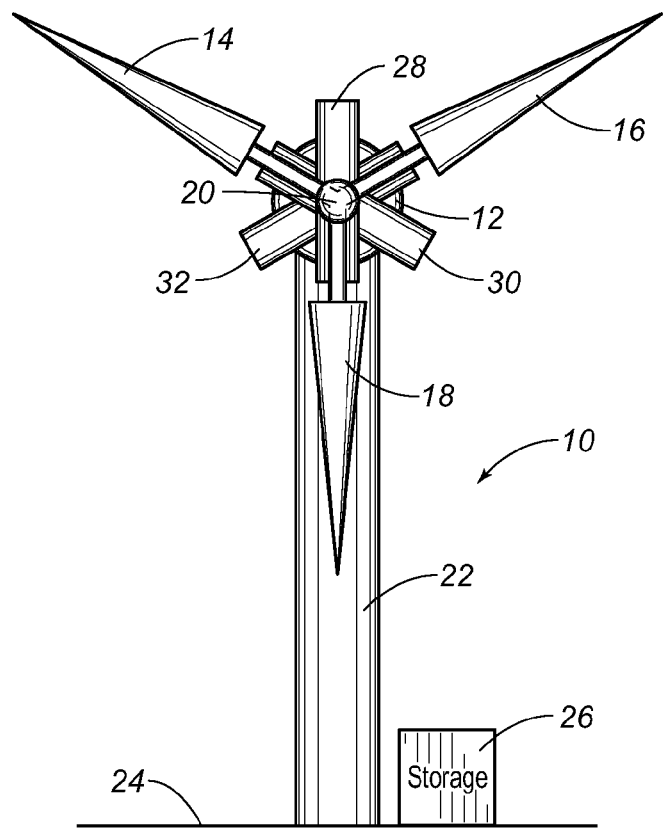
FIG. 1 is a front elevational view showing the wind energy generator in accordance with the preferred embodiment of the present invention.

Referring to FIG. 1, there is shown the wind energy generator 10 in accordance with the preferred embodiment of the present invention. The wind energy generator 10 includes a generator 12 which has a plurality of blades 14, 16 and 18 rotatably mounted thereto. In particular, the blades 14, 16 and 18 extend radially outwardly of a shaft 20 that is interconnected to the generator 12. In conventional use, the generator 12 can be in the form of a turbine which generates power by the rotation of the blades 14, 16, and 18 and by the rotation of the associated shaft. Various other configurations of wind energy generator 10 can be made within the scope of the present invention. The illustration of the wind energy generator 10 in FIG. 1 is merely for illustrative purposes. It is known that a wide variety of numbers and shapes of blades, of types of turbines, of shaft/turbine interconnections, and support structures are known within the art. The present invention can apply to a wide variety of such wind energy generators.

In FIG. 1, it can be seen that the generator 12 is mounted on top of a support pole 22. Support pole 22 positions the blades 14, 16 and 18 in a desired location above the earth. In conventional use, gimballing can be used so that the generator 12, along with the blades 14, 16 and 18, will rotate so as to properly face the direction of the wind an in order to achieve maximum power generation therefrom. The power that is generated from the rotation of the shaft 20 can be stored in battery 26 located at the level of the earth 24.

In FIG. 1, it can be seen that there is a first elongate chamber 28 that is mounted on shaft 20. Another elongate chamber 30 is also mounted on shaft 20. Additionally, another elongate chamber 32 is also mounted on shaft 20. The elongate chamber 28 is linear aligned with the axis of the blade 18 and extends outwardly beyond the end of the blade 18. In other words, one end of the elongate chamber 28 is located on the opposite side of the shaft 20 from the blade 18. Similarly, the elongate chamber 30 also extends outwardly beyond the end of the blade 14 on the opposite side of the shaft 20 from the blade 14. Additionally, the elongate chamber 32 will is aligned with the blade 16 and will also have a portion which extends outwardly beyond the shaft 20 from the blade 16. It is this construction that allows the present invention to be operated properly.

It should be noted that, within the concept of the present invention, the elongate chambers 28, 30 and 32 can be incorporated into the body of each of the blades. Additionally, a variety of constructions can be used whereby the elongate chambers 28, 30, and 32 can extend through the shaft 20. As one example, the shaft 20 an be in the form of a cylindrical member having a suitable openings therein through which the elongate chambers 28, 30 and 32 extend. An end of the elongate chamber 28 is illustrated as positioned between the radially offset blades 14 and 16. An end of the elongate chamber 30 is radially positioned centrally between the radially offset blades 16 and 18. An end of the elongate chamber 32 is positioned so as to be evenly radially spaced between the radially-offset blades 14 and 18. Once again, this configuration facilitates the ability of the present invention to operate under low wind conditions and be properly balanced during the rotation of the blades. In circumstances where the wind energy generator 10 only includes a pair of blades, then only a pair of the elongate chambers need to be used. In the concept of the present invention, it is generally desirable that the elongate chambers be aligned with the longitudinal axis of the each of the blades.

Figure 2:
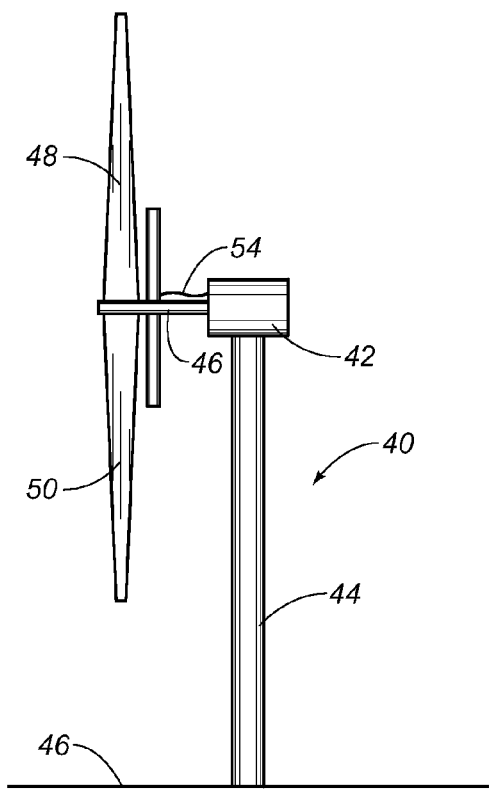
FIG. 2 is a side elevational view showing the wind energy generator in accordance an embodiment of the present invention.

FIG. 2 illustrates the wind energy generator 40 as used with a two-blade system. In particular, the generator 42 is supported on a structural support 44 in a location above the earth 46. The generator 42 has a shaft 46 extending forwardly outwardly therefrom. A blade 48 extends outwardly from one end of the shaft 46. Another blade 50 will extend outwardly from the end of the shaft 46 opposite to blade 48. In this arrangement, a single elongate chamber 52 extends the across the shaft 46. A power line 54 can serve to deliver electrical energy to the elongate chamber 52 and to transmit power generated from the elongate chamber 52 back to the generator 42.

Figure 3:
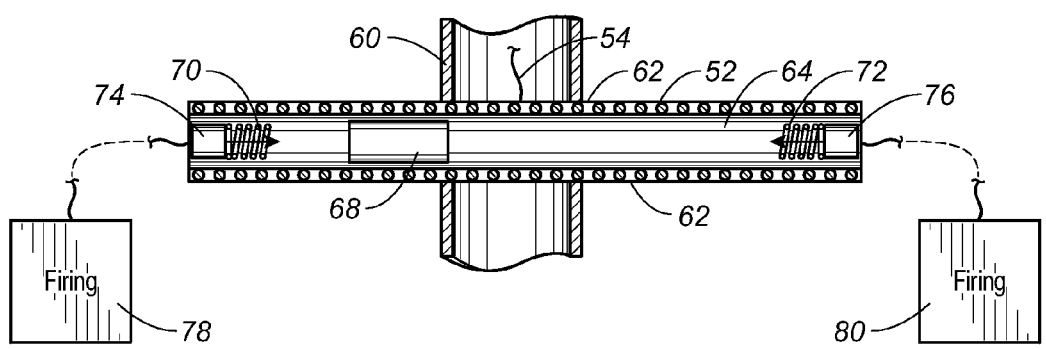
FIG. 3 is a cross-sectional view showing the operation of the magnet within the elongate chamber and showing, in particular, an intermediate location of the magnet within the chamber.

FIG. 3 illustrates the elongate chamber 52 as mounted on the shaft 60. In particular, the elongate chamber 52 has a coil 62 extending longitudinally therealong. In normal use, the coil 62 can be shielded by the exterior surface of the elongate chamber 52 and positioned on the interior 64 of the chamber 52. A suitable protective surface 66 can be placed on the interior 64 of the chamber 62 so as to provide protection to the coil 62. An electrical line 54 is electrically connected to the coil 62 so as to deliver exciting energy to the coil 62. Electrical line 54 can also deliver power from the coil 62 outwardly of the elongate chamber 52.

A magnet 68 is slidably positioned within the interior 64 of the elongate chamber 52. The magnet 62 is free to slide back and forth within the interior 64 during the rotation of the elongate chamber 52. It is known in electronics that the sliding movement of the magnet 64 relative to the excited coil 62 will serve to generate energy. The strength and size of the magnet 68, along with the rapidity of the back-and-forth movement, will be determinative of the amount of power generated from the coil 62.

A first spring 70 is mounted one end of the elongate chamber 52. A second spring 72 is mounted at an opposite end of the elongate chamber. A spring retractor 74 is cooperative with the spring 70. Similarly, a spring retractor 76 is cooperative with the spring 72. A firing mechanism 78 serves to control the retractor 74 associated with the spring 70. Another firing mechanism 80 is electrically connected to the retractor 76 so as to control the movement of the spring 72. In normal use, as the magnet 68 approaches the spring 70, the firing mechanism 78 transmits an electrical signal to the retractor 74 so as to retract the spring 70. When the end of the magnet 78 contacts the spring 70, the firing mechanism 78 will serve to release the spring 70 and, thus, propel the magnet 68 back toward the spring 72 located at the opposite end of the elongate chamber 52. As the magnet 68 travels in this manner, it passes through the electrical field of the coil 62 so as to generate electricity therefrom.

Figure 4:
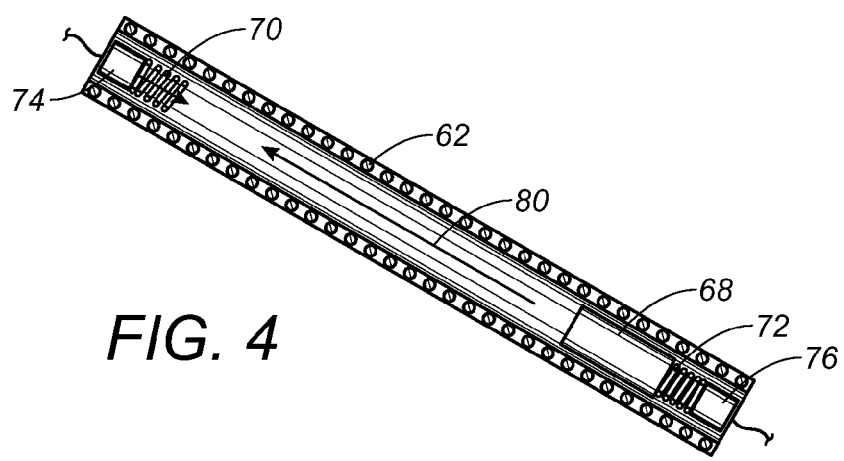
FIG. 4 illustrates the movement of the magnet within the chamber so as to contact a propulsion spring.

FIG. 4 shows, this operation. In FIG. 4, it can be seen that the magnet 68 has contacted the spring 72 associated the retractor 76. A firing signal is transmitted to the retractor 76 by the firing mechanism 80 so as to release the spring 72. This propels the magnet 68 in the direction of arrow 80 back toward the first spring 70. The movement of the magnet 68 can also be facilitated by the inertial forces caused by the rotation of the blades 14, 16 and 18 on the wind energy generator 10.

Referring to FIG. 1, in normal use, as the blades 14, 16 and 18 control rotate due to wind energy, the firing mechanisms 78 and 80 are coordinated so as to properly cause the back and forth movement of the magnet 68 across the coil 62 within the elongate chamber 52. Additionally, the force of gravity will tend to urge the magnet 68 toward the lowermost end of the particular elongate chamber. As a result, the electrical-generating forces caused by the movement of the magnet 68 within the elongate chamber 52 are caused by three forces: (1) the force of gravity; (2) the inertial forces caused by the rotation of the blades; and (3) the firing of the respective springs 70 and 72 within the chamber. It should be also noted that when the magnet 68 is at the end of the elongate chamber 52 opposite the respective blade, the weight of the magnet 68 will urge the continued rotation of the blade, regardless of wind conditions. In other words, a timed firing of the respective springs 70 and 72 can be carried out so as to maintain the rotation of the blades 14, 16 and 18, even in low-wind conditions. As such, during high wind conditions, the energy produced by the rotating blades can partially be used so as to continue the rotation of the blades in low wind conditions by the operation of the auxiliary generator of the present invention. As a result, the present invention acts as a wind energy storage device.

Figure 5:
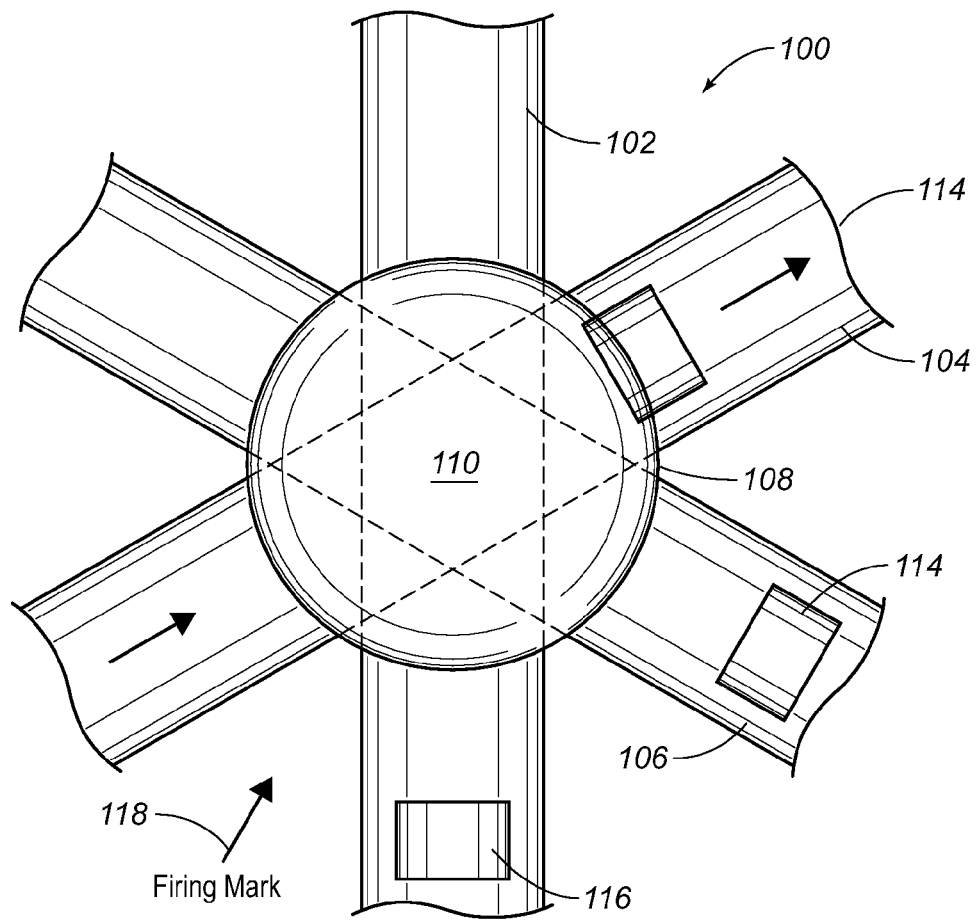
FIG. 5 is a diagrammatic illustration of an alternative embodiment of the energy generator of the present invention.

Referring to FIG. 5, there is shown the mechanism 100 whereby the various elongate chambers 102, 104 and 106 are each mounted in co-planar relationship across a rotor hub 108. As such, each of the elongate chambers 102, 104 and 106 will intersect in the center 110 of the rotor hub 108.

In particular in FIG. 5, it can be seen that the magnet 112 has been fired so as to move toward the end 114 of the elongate chamber 104. The magnet 114 is positioned at the end of the elongate chamber 106. Similarly, the magnet 116 is positioned at the bottom of the elongate chamber 102. A firing mark 118 is indicated as the point in time in which a firing charge is transmitted so that the firing mechanism associated with the elongate chamber 104 serves to transmit the magnet 102 through the interior of the elongate chamber 104. Since only a single magnet is fired at any point in time, there is no danger of the magnets 112, 114 and 116 contacting each other as they pass through the center 110 of the rotor hub 108. Additionally, this is rather a simply mechanism where only a single magnet is fired at any point in time than in which the firing point is the same throughout the rotation of the mechanism 110.

In FIG. 5, it can be further seen that each of the magnets 112, 114 and 116 is in a position to generally enhance the rotation of the elongate chambers 102, 104 and 106 by way of gravity. The magnets 112, 114 and 116 will serve as weights which urge the rotation of the associated blades by action of gravity. By way of the present invention, energy generation can be accomplished by: (1) the rotation of the blades as caused by the gravity forces exerted upon the elongate chambers; and (2) by the movement of the magnets 112, 114 and 116 across the coils. Since the present invention is intended for non-peak wind conditions, it is believed that the energy generating capability of mechanism 100 will serve to significantly offset any energy losses caused by such non-peak wind conditions.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wind energy generator comprising:
   a generator having a shaft extending therefrom;
   a plurality of blades interconnected to said shaft, said plurality of blades being rotatable by action of wind energy, said plurality of blades being radially spaced from each other; and
   an elongate chamber cooperative with said shaft such that said elongate chamber rotates relative to a rotation of said shaft, said elongate chamber having a coil extending therearound, said elongate chamber having a magnet positioned therein such that a movement of said magnet interacts with an electrical field of said coil so as to produce electrical energy therefrom, said elongate chamber having a propulsion means therein suitable for urging said magnet back and forth during the rotation of said plurality of blades, said propulsion means comprising:
      a first spring mounted at one end of said elongate chamber; and
      a second spring mounted at an opposite end of said elongate chamber;
      a first spring retraction means connected to said first spring for retracting said first spring prior to contact by said magnet during the rotation of said plurality of blades; and
      a second spring retraction means connected to said second spring for retracting said second spring prior to contact by said magnet during the rotation of said plurality of blades.

2. The generator of claim 1, said magnet being slidably movable within said elongate chamber relative to the rotation of said plurality of blades.

3. The generator of claim 1, said elongate chamber extending transversely to said shaft.

4. The generator of claim 3, said elongate chamber being offset from said plurality of blades.

5. The generator of claim 1, said elongate chamber comprising:
   a first elongate chamber;
   a second elongate chamber radially offset from said first elongate chamber; and
   a third elongate chamber radially offset from each of said first and second elongate chambers.

6. The generator of claim 1, each of said first and second spring retraction means being actuatable so as to release the spring so as to propel said magnet through said interior of elongate chamber.

7. The generator of claim 1, further comprising:
   a firing means connected to said first and second spring retraction means for actuating said first and second springs and said magnet approaches one said first and second springs.

8. The generator of claim 1, further comprising:
   an energy storing means electrically connected to said coil so as to receive power from said coil.

9. A method of generating energy from a wind energy generator comprising:
   forming an elongate chamber having a coil extending longitudinally therearound, said elongate chamber having a magnet slidably received therein;
   rotating said elongate chamber with a rotation of blades of the wind energy generator;
   sliding said magnet within said elongate chamber back and forth as said elongate chamber is rotated so as to produce electrical energy from said coil;
   transferring electrical energy from said coil; and
   propelling said magnet from one end of said elongate chamber toward another end of said elongate chamber during the rotation of said elongate chamber, said step of propelling comprising:
      retracting a spring mounted on each of said ends of said elongate chamber prior to contact by said magnet; and
      releasing the spring when said magnet contacts the spring so as to propel said magnet.

10. The method of claim 9, further comprising:
    mounting said elongate chamber so as to be axially aligned with at least one of the blades of the wind energy generator, said elongate chamber extending outwardly beyond an end of the blade.

11. An apparatus for generating auxiliary energy from a wind energy generator comprising:
    an elongate chamber;
    a coil extending longitudinal along said elongate chamber;
    a magnet slidably positioned within said elongate chamber;
    a propulsion means mounted in opposite ends of said elongate chamber, said propulsion means for propelling said magnet across said coil, said propulsion means comprising:
       a first spring mounted at one end of said elongate chamber;
       a second spring mounted at an opposite end of said elongate chamber;

a first spring retraction means connected to said first spring for retracting said first spring prior to contact by said magnet during the rotation of said elongate chamber; and a second spring retraction means connected to said second spring for retracting said second spring prior to contact by said magnet during the rotation of said elongate chamber; and a mounting means affixed to said elongate chamber for mounting said elongate chamber to a rotatable element of the wind energy generator.

12. The generator of claim 11, each of said first and second spring retraction means being actuatable so as to release the spring so as to propel said magnet through said interior of elongate chamber.

13. The apparatus of claim 11, further comprising:

a firing means connected to each of first and second spring retraction means for actuating said first and second spring when said magnet approaches one of said first and second springs.

* * * * *